United States Patent [19]

Yoshida

[11] Patent Number: 5,467,298
[45] Date of Patent: * Nov. 14, 1995

[54] MULTIVALUED ADDER HAVING CAPABILITY OF SHARING PLURAL MULTIVALUED SIGNALS

[75] Inventor: Yukihiro Yoshida, Ikoma, Japan

[73] Assignee: Sharp Kabushiki Kaisha, Osaka, Japan

[*] Notice: The portion of the term of this patent subsequent to Oct. 31, 2012, has been disclaimed.

[21] Appl. No.: 155,828

[22] Filed: Nov. 23, 1993

[30] Foreign Application Priority Data

Nov. 26, 1992 [JP] Japan .................................... 4-316680

[51] Int. Cl.⁶ .................................................... G06F 7/00
[52] U.S. Cl. ........................................ 364/746.2; 364/768
[58] Field of Search ................................. 364/746.2, 768

[56] References Cited

U.S. PATENT DOCUMENTS

| | | | |
|---|---|---|---|
| 4,914,614 | 4/1990 | Yamakawa | 364/746.2 |
| 5,227,993 | 7/1993 | Yamakawa | 364/746.2 |
| 5,299,145 | 3/1994 | Yoshida | 364/746.2 |

FOREIGN PATENT DOCUMENTS

| | | |
|---|---|---|
| 5-73269 | 3/1993 | Japan . |
| 5-158659 | 6/1993 | Japan . |

*Primary Examiner*—Tan V. Mai

[57] ABSTRACT

A multivalued adder for processing addition of a first data and a second data, which are one of binary logic and multivalued logic, includes a first and second input circuit. The first input circuit includes parallel inputs for binary logic and multivalued logic, and receives the first data. The first input circuit also outputs a first set of bit data representing the first data. Similarly, the second input circuit includes parallel inputs for binary logic and multivalued logic, and receives the second data. The second input circuit also outputs a second set of bit data representing the second data. An adding circuit, connected to the first and said second input circuits, adds the second set of bit data and the first set of bit data. An output circuit, connected to the adding circuit, converts the output of the adding circuit into data in binary logic and multivalued logic, in parallel, and outputs converted data in binary logic and multivalued logic, in parallel.

12 Claims, 10 Drawing Sheets

MULTIVALUED ADDER HAVING CAPABILITY OF SHARING PLURAL MULTIVALUED SIGNALS

BACKGROUND OF THE INVENTION

1. Field of the Invention

The present invention relates to a multivalued adder which may apply to various data processings such as image processing, signal processing for communication and working of fonts for a laser printer or a microprocessor.

2. Description of the Related Art

In general, an adder is a kind of arithmetic and logic unit and is a dedicated circuit for addition.

Recently, computer-equipped instruments containing logic operating units such as a microprocessor have been used in the society. These computer-equipped instruments include a personal computer, a point of sales (POS) terminal and a cash register. In such instruments, an adder is built-in for executing various logic operations, and the operating performance of the adder is likely increase through the use of various methods.

The conventional adder known by the inventors of the present application, however, provides more operating gate stages as the processing of bit signals becomes faster and faster. More operating gate states result in delaying a signal by a greater amount, thereby making the addition unstable. The conventional adder has such a disadvantage.

Furthermore, known instruments based on binary electronics have been requested to have faster and more highly functional electronic components as the amount of data to be processed increases and larger. The binary electronics technique, however, provides limited information processing capability. Hence, the technique cannot cope with a quantity of data larger than a certain level. This means that the operating capability given by the binary electronics technique cannot achieve the capability which is now being requested. This is another disadvantage.

SUMMARY OF THE INVENTION

It is an object of the present invention to provide a multivalued adder which is capable of executing addition at fast speed without having to increase the circuit in scale and sharing a multivalued bit signal.

In carrying out the object, a multivalued adder includes: an apparatus for processing addition between a first data and a second data, each of said first and second data being in one of binary logic and multivalued logic, comprising: first input means having parallel inputs of binary logic and multivalued logic for receiving said first data, and for outputting a first set of bit data representing said first data; second input means having parallel inputs of binary logic and multivalued logic for receiving said second data, and for outputting a second set of bit data representing said second data; adding means connected to said first input means and said second input means for adding said second set of bit data and said first set of bit data; and output means, connected to said adding means, for converting output of said adding means into data in binary logic and multivalued logic, in parallel, and for outputting converted data in binary logic and multivalued logic, in parallel.

As will be understood from the arrangement and operation, the multivalued adder according to the present invention enables enhancement of adding speed if the processing amount of bit signals to be executed at one time is increased, without having to enlarge the circuit in scale. Further, the multivalued adder has a fewer number of circuit components, thereby lowering the power consumption. Since the number of signals to be processed can be reduced, the number of wires mounted on an LSI circuit is reduced. This results in making it possible to implement high integration, thereby sharing binary signals and multivalued signals, such as a ternary signal and a quaternary signal in the multivalued circuit of this invention.

Further objects and advantages of the present invention will be apparent from the following description of the preferred embodiments of the invention as illustrated in the accompanying drawings.

BRIEF DESCRIPTION OF THE DRAWINGS

FIG. 1b is a circuit diagram showing the other part of the ternary adder shown in FIG. 1a;

FIG. 8b is a circuit diagram showing the other part of the quaternary adder shown in FIG. 8a;

DESCRIPTION OF THE PREFERRED EMBODIMENT

Figure 1A:
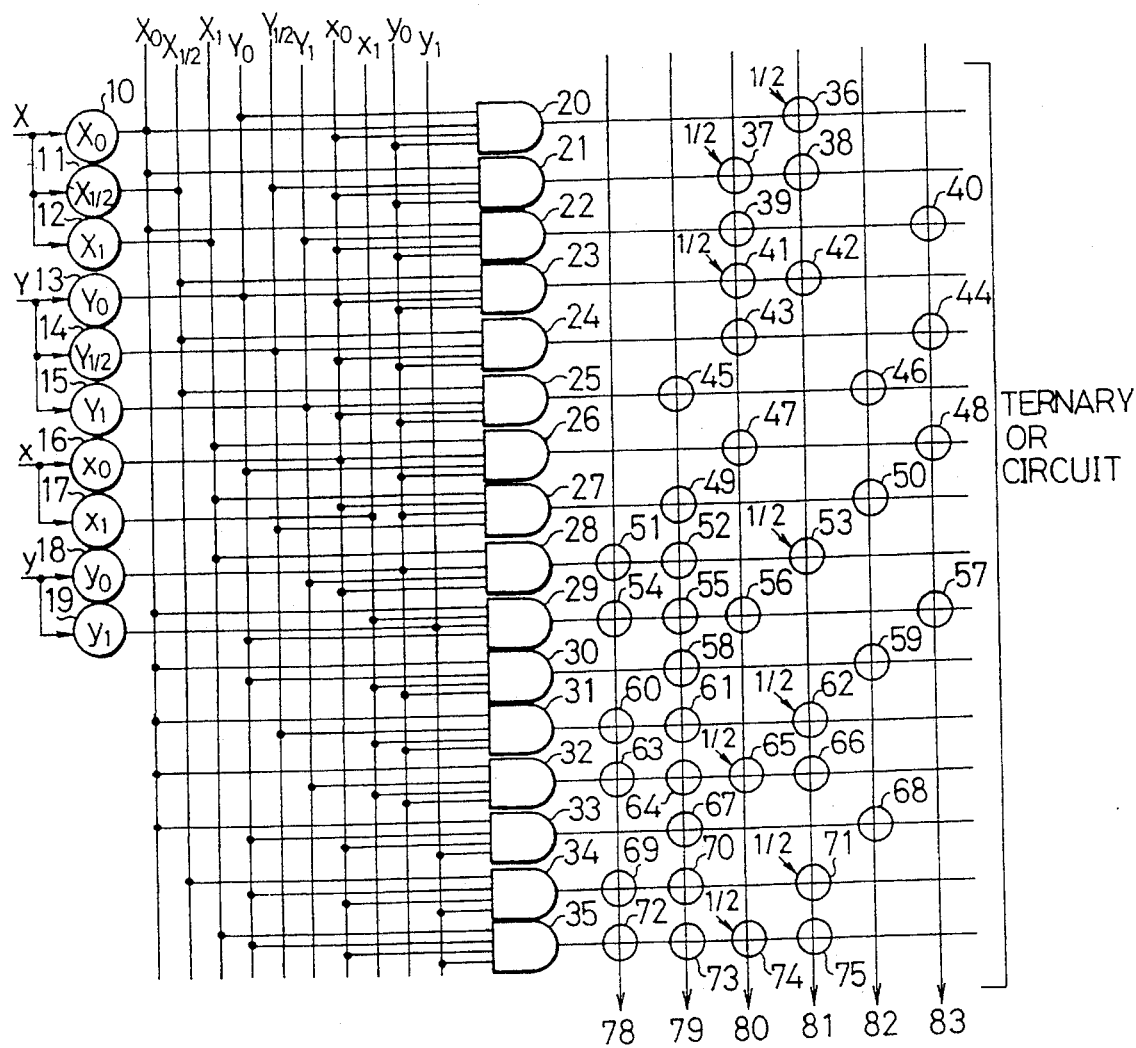
FIG. 1a is a circuit diagram showing a partial arrangement of a ternary adder according to a first embodiment of the present invention.

Hereafter, the description will be oriented to a multivalued adder according to an embodiment of the present invention as referring to the drawings.

Figure 1B:
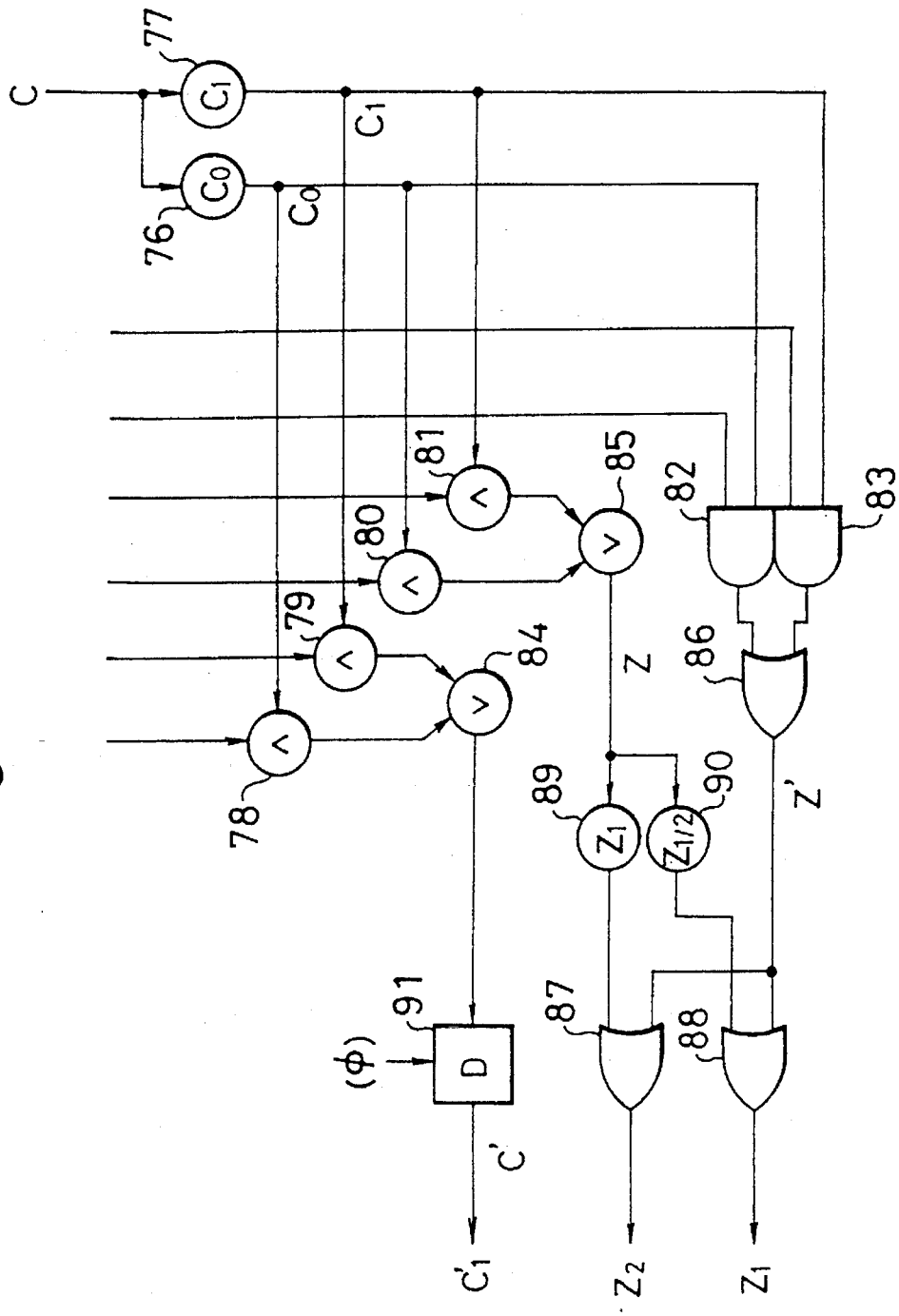

FIGS. 1a and 1b are a circuit diagram showing an arrangement of a ternary adder according to an embodiment of the present invention. The ternary adder shown in FIGS. 1a and 1b is arranged to have I/O elements 10 to 19, logical AND circuit elements (referred to as AND elements) 20 to 35, multivalued functional elements 36 to 75, I/O elements 76 and 77, AND elements 78 to 83, logical OR circuit elements (referred to as OR elements) 84 to 88, I/O elements 89 and 90, and a one-bit delay circuit 91.

Next, each component will be discussed in detail.

The I/O element 10 inputs a ternary signal X and outputs a binary signal $X_0$. The I/O element 11 inputs a ternary signal X and outputs a binary signal $X_{1/2}$. The I/O element 12 inputs a ternary signal X and outputs a binary signal $X_1$.

The I/O element 18 inputs a ternary signal Y and outputs a binary signal $Y_0$. The I/O element 14 inputs a ternary signal Y and outputs a binary signal $Y_{1/2}$. The I/O element 15 inputs a ternary signal Y and outputs a binary signal $Y_1$.

The I/O element 18 inputs a binary signal x and outputs a binary signal $x_0$. The I/O element 17 inputs a binary signal x and outputs a binary signal $x_1$.

The I/O element 18 inputs a binary signal y and outputs a binary signal $y_0$. The I/O element 19 inputs a binary signal y and outputs a binary signal $y_1$.

The AND element 20 inputs the binary signals $X_0$, $Y_0$, $x_0$ and $y_0$ and outputs a logical product of them. The AND element 21 inputs the binary signals $X_0$, $Y_{1/2}$, $x_0$ and $y_0$ and outputs a logical product of them. The AND element 22 inputs the binary signals $X_0$, $Y_1$, $x_0$ and $y_0$ and outputs the logical product of them.

The AND element 28 inputs the binary signals $X_{1/2}$, $Y_0$, $x_0$ and $y_0$ and outputs a logical product of them. The AND element 24 inputs the binary signals $X_{1/2}$, $Y_{1/2}$, $x_0$ and $y_0$ and outputs a logical product of them. The AND element 25 inputs the binary signals $X_{1/2}$, $Y_1$, $x_0$ and $y_0$ and outputs the logical product of them.

The AND element 28 inputs the binary signals $X_1$, $Y_0$, $x_0$ and $y_0$ and outputs a logical product of them. The AND element 27 inputs the binary signals $X_1$, $Y_{1/2}$, $x_0$ and $y_0$ and outputs a logical product of them. The AND element 28 inputs the binary signals $X_1$, $Y_1$, $x_0$ and $y_0$ and outputs the logical product of them.

The AND element 29 inputs the binary signals $X_0$, $Y_0$, $x_1$ and $y_1$ and outputs a logical product of them. The AND element 30 inputs the binary signals $X_0$, $Y_0$, $x_1$ and $y_0$ and outputs a logical product of them. The AND element 81 inputs the binary signals $X_0$, $Y_{1/2}$, $x_1$ and $y_0$ and outputs the logical product of them.

The AND element 32 inputs the binary signals $X_0$, $Y_1$, $x_1$ and $y_0$ and outputs a logical product of them. The AND element 33 inputs the binary signals $X_0$, $Y_0$, $x_0$ and $y_1$ and outputs a logical product of them. The AND element 34 inputs the binary signals $X_{1/2}$, $Y_0$, $x_0$ and $y_1$ and outputs the logical product of them. The AND element 35 inputs the binary signals $X_1$, $Y_0$, $x_0$ and $y_1$ and outputs the logical product of them.

The multivalued functional element 36 inputs an output signal sent from the AND element 20 and outputs a ternary threshold value.

The multivalued functional element 87 inputs an output signal sent from the AND element 21 and outputs a ternary threshold value. The multivalued functional element 38 inputs an output signal sent from the AND element 21 and outputs a binary threshold value.

The multivalued functional element 39 inputs an output signal sent from the AND element 22 and outputs a binary threshold value. The multivalued functional element 40 inputs an output signal sent from the AND element 22 and outputs a binary threshold value.

The multivalued functional element 41 inputs an output signal sent from the AND element 23 and outputs a ternary threshold value. The multivalued functional element 42 inputs an output signal sent from the AND element 23 and outputs a binary threshold value.

The multivalued functional element 43 inputs an output signal sent from the AND element 24 and outputs a binary threshold value. The multivalued functional element 44 inputs an output signal sent from the AND element 24 and outputs a binary threshold value.

The multivalued functional element 45 inputs an output signal sent from the AND element 25 and outputs a binary threshold value. The multivalued functional element 46 inputs an output signal sent from the AND element 25 and outputs a binary threshold value.

The multivalued functional element 47 inputs an output signal sent from the AND element 26 and outputs a binary threshold value. The multivalued functional element 48 inputs an output signal sent from the AND element 26 and outputs a binary threshold value.

The multivalued functional element 49 inputs an output signal sent from the AND element 27 and outputs a binary threshold value. The multivalued functional element 50 inputs an output signal sent from the AND element 27 and outputs a binary threshold value.

The multivalued functional element 51 inputs an output signal sent from the AND element 28 and outputs a binary threshold value. The multivalued functional element 52 inputs an output signal sent from the AND element 28 and outputs a binary threshold value. The multivalued functional element inputs an output signal sent from the AND element 28 and outputs a ternary threshold value.

The multivalued functional element 54 inputs an output signal sent from the AND element 29 and outputs a binary threshold value. The multivalued functional element 55 inputs an output signal sent from the AND element 29 and outputs a binary threshold value. The multivalued functional element 56 inputs an output signal sent from the AND element 29 and outputs a binary threshold value. The multivalued functional element 57 inputs an output signal sent from the AND element 29 and outputs a binary threshold value.

The multivalued functional element 58 inputs an output signal sent from the AND element 30 and outputs a binary threshold value. The multivalued functional element 59 inputs an output signal sent from the AND element 30 and outputs a binary threshold value.

The multivalued functional element 60 inputs an output signal sent from the AND element 81 and outputs a binary threshold value. The multivalued functional element 61 inputs an output signal sent from the AND element 31 and outputs a binary threshold value. The multivalued functional element 62 inputs an output signal sent from the AND element 31 and outputs a ternary threshold value.

The multivalued functional element 63 inputs an output signal sent from the AND element 82 and outputs a binary threshold value. The multivalued functional element 64 inputs an output signal sent From the AND element 32 and outputs a binary threshold value. The multivalued functional element 65 inputs an output signal sent from the AND element 32 and outputs a ternary threshold value. The multivalued functional element 66 inputs an output signal sent from the AND element 32 and outputs a binary threshold value.

The multivalued functional element 87 inputs an output signal sent from the AND element 83 and outputs a binary threshold value. The multivalued functional element 68 inputs an output signal sent from the AND element 33 and outputs a binary threshold value.

The multivalued functional element 89 inputs an output signal sent from the AND element 34 and outputs a binary threshold value. The multivalued functional element 70 inputs an output signal sent from the AND element 34 and outputs a binary threshold value. The multivalued functional element 71 inputs an output signal sent from the AND element 34 and outputs a ternary threshold value.

The multivalued functional element 72 inputs an output signal sent from the AND element 35 and outputs a binary threshold value. The multivalued functional element 73 inputs an output signal sent from the AND element 35 and outputs a binary threshold value. The multivalued functional element 74 inputs an output signal sent From the AND element 85 and outputs a ternary threshold value. The multivalued functional element 75 inputs an output signal sent from the AND element 35 and outputs a binary threshold value.

The I/O element 78 inputs a carry signal C and outputs a binary carry signal $C_0$. The I/O element 77 inputs a carry signal C and outputs a binary carry signal $C_1$.

The AND element 78 inputs an output signal from any one of the multivalued functional elements 51, 54, 60, 68, 69 and 72 and a binary carry signal $C_0$ from the I/O element 76 and outputs a logical product of them.

The AND element 79 inputs an output signal from any one of the multivalued functional elements 45, 49, 52, 55, 58, 61, 64, 67, 70 and 73 and a binary carry signal $C_1$ from the I/O element 77 and outputs a logical product of them.

The OR element 84 inputs the logical product from the AND element 78 and the logical product from the AND element 79 and outputs a logical sum of them.

The delay circuit 91 inputs the logical sum from the OR element 84 and outputs a binary carry signal C'. The binary carry signal C' is also outputted as a carry signal $C'_1$.

The AND element 80 inputs an output from any one of the multivalued functional elements 37, 39, 41, 48, 47, 56, 65 ad 74 and a binary carry signal $C_0$ from the I/O element 78 and outputs a logical product of them.

The AND element 81 inputs an output from any one of the multivalued functional elements 36, 38, 42, 58, 62, 68, 71 and 75 and a binary carry signal $C_1$ from the I/O element 77 and outputs a logical product of them. The OR element 85 inputs the logical products from the AND elements 80 and 81 and outputs an added output Z, that is, the logical sum of these logical products. The added output Z is applied to the I/O elements 89 and 90.

The AND element 82 inputs an output from any one of the multivalued functional elements 46, 50, 59 and 68 and a binary carry signal $C_0$ from the I/O element 78 and outputs a logical product of them. The AND element 83 inputs an output from any one of the multivalued functional elements 40, 44, 48 and 57 and a binary carry signal $C_1$ from the I/O element 77 and outputs a logical product of them. The OR element 86 inputs the logical products from the AND elements 82 and 88 and outputs an added output Z', that is, the logical sum of these logical products.

The I/O element 89 inputs the added output Z and outputs the added output $Z_1$. The I/O element 90 inputs the added output Z and outputs the added output $Z_{1/2}$.

The OR element 87 inputs the added output $Z_1$ from the I/O element 89 and the added output Z' From the OR element 88 and outputs an added output $Z_2$, that is, the logical sum of them. The OR element 88 inputs the added output $Z_{1/2}$ from the I/O element 90 and the added output Z' from the OR element 88 and outputs an added output $Z_1$, that is, a logical sum of them.

The multivalued functional element may be a quantizing functional element. The quantizing functional element uses as an operating principle the wave theory of electrons and the quantum-mechanical quality that electrons hold energy merely at scattered spots. This element has a multivalued logic and is often referred to as a micro-structural element, a quantum-level element, or a quantum-wave element.

Figure 2:
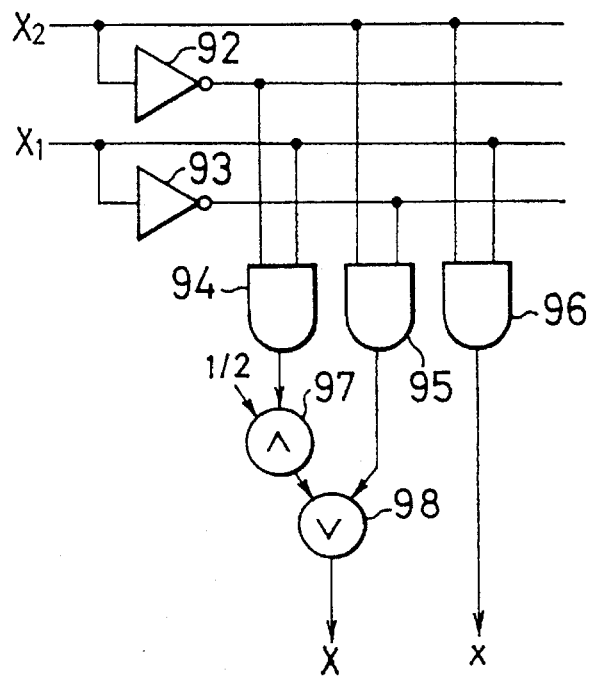
FIG. 2 is a circuit diagram showing an arrangement of a ternary binary I/O circuit which may apply to the ternary adder shown in FIGS. 1a and 1b.

Two-bit parallel binary input signals x and X shown in FIG. 1 are obtained by the binary input circuit shown in FIG. 2.

The binary input circuit shown in FIG. 2 is composed of NOT circuit elements (referred to as NOT elements) 92 and AND elements 94 to 97, and an OR element 98.

Next, the description will be oriented to the operation of the binary input circuit shown in FIG. 2.

The NOT element 92 inputs the binary signal $X_2$ and outputs a NOT signal of the signal $X_2$. The NOT element 93 inputs the binary signal $X_1$ and outputs a NOT signal of the signal $X_1$.

The AND element 94 inputs an output signal from the NOT element 92 and the binary signal $X_1$ and outputs a logical product of them. The AND element 95 inputs an output signal From the NOT element 93 and the binary signal $X_2$ and outputs a logical product of them. The AND element 96 inputs the binary signals $X_2$ and $X_1$ and outputs a logical product of them, that is, a binary signal x. The AND element 97 inputs the logical product from the AND element 94 and a ternary threshold value ½ and outputs a logical product of them. The OR element 98 inputs the logical products from the AND elements 97 and 95 and outputs a logical product of them, that is, a ternary signal X.

Figure 3:
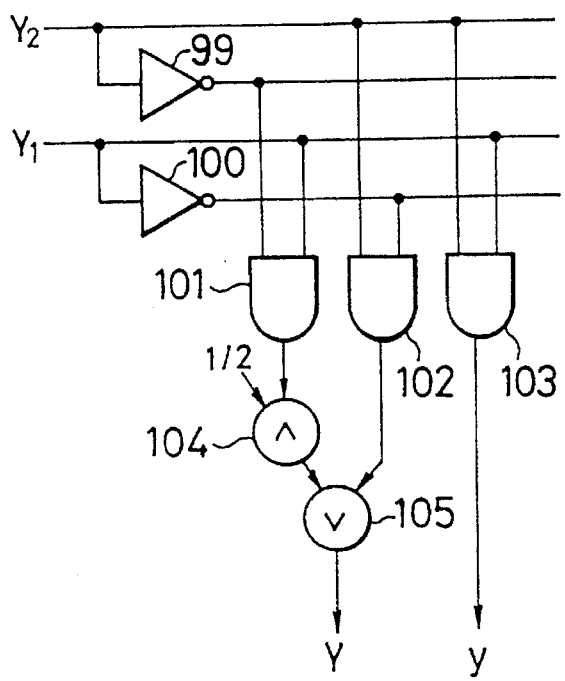
FIG. 3 is a circuit diagram showing an arrangement of a ternary binary I/O circuit which may apply to the ternary adder shown in FIGS. 1a and 1b.

The binary input signals y and Y are obtained from the binary input circuit shown in FIG. 3.

The binary input circuit shown in FIG. 3 is composed of NOT elements 99 and 100, AND elements 101 to 104 and an OR element 105.

Next, the description will be oriented to the operation of the binary input circuit shown in FIG. 3.

The NOT element 99 inputs the binary signal $Y_2$ and outputs the NOT signal of the signal $Y_2$. The NOT element 100 inputs the binary signal $Y_1$ and outputs the NOT signal of the signal $Y_1$.

The AND element 101 inputs an output signal from the NOT element 99 and the binary signal $Y_1$ and outputs a logical product of them. The AND element 102 inputs an output signal from the NOT element 100 and the binary signal $Y_2$ and outputs a logical product of them. The AND element 103 inputs the binary signals $Y_2$ and $Y_1$ and outputs a logical product of them, that is, a binary signal y. The AND element 104 inputs the logical product from the AND element 101 and a ternary threshold value ½ and outputs a logical product of them. The OR element 105 inputs the logical products from the AND elements 104 and 102 and outputs a logical product of them, that is, a ternary signal Y.

Table 1 lists codes allocated to two-bit parallel binary input signals $X_2$, $X_1$, $Y_2$ and $Y_1$, ternary output signals X, x, Y and y, and carry signals $C_2$, $C_1$ and C.

TABLE 1

| $X_2$ | $X_1$ | $Y_2$ | $Y_1$ | x | X | y | Y | $C_2$ | $C_1$ | C |
|---|---|---|---|---|---|---|---|---|---|---|
| 0 | 0 | 0 | 0 | 0 | 0 | 0 | 0 | 0 | 0 | 0 |
| 0 | 1 | 0 | 1 | 0 | ½ | 0 | ½ | 0 | 1 | 1 (½) |
| 1 | 0 | 1 | 0 | 0 | 1 | 0 | 1 | — | — | |
| 1 | 1 | 1 | 1 | 1 | 0 | 1 | 0 | — | — | |
| | | | | | (½  0) | | (½  0) | | | |

The expressions (1) and (2) indicate logical expressions corresponding to the Table 1.

$$X = \frac{1}{2}\bar{X}_2 X_1 + X_2 \bar{X}_1, \ x = X_2 X_1 \left( \text{or } x = \frac{1}{2} X_2 X_1 \right) \quad (1)$$

$$Y = \frac{1}{2}\bar{Y}_2 Y_1 + Y_2 \bar{Y}_1, \ x = Y_2 Y_1 \left( \text{or } y = \frac{1}{2} Y_2 Y_1 \right) \quad (2)$$

Chart 1 lists logics provided in the ternary adder. Chart 2 lists carry outputs used in the ternary adder.

Chart 1
<Z', Z>

| | | ← $C_0$ → | | | ← $C_1$ → | | |
|---|---|---|---|---|---|---|---|
| | ← $x_0$ → | | ← $x_1$ → | ← $x_0$ → | | | ← $x_1$ → |
| | $X_0$ | $X_{1/2}$ | $X_1$ | $X_0$ | $X_0$ | $X½$ | $X_1$ | $X_0$ |
| ↑ $Y_0$ | | 1 | 2 | 3 | 1 | 2 | 3 | |
| $y_0$ $Y_{1/2}$ | 1 | 2 | 3 | | | 2 | 3 | 1 |
| ↓ $Y_1$ | 2 | 3 | | 1 | 3 | | 1 | 2 |
| ↑ $y_1$ $Y_0$ ↑ | 3 | | 1 | 2 | | 1 | 2 | 3 |

Chart 2
<C>

| | | ← $C_0$ → | | | ← $C_1$ → | | |
|---|---|---|---|---|---|---|---|
| | ← $x_0$ → | | ← $x_1$ → | ← $x_0$ → | | | ← $x_1$ → |
| | $X_0$ | $X_{1/2}$ | $X_1$ | $X_0$ | $X_0$ | $X½$ | $X_1$ | $X_0$ |
| ↑ $Y_0$ | | | | | | | | 1 |
| $y_0$ $Y_{1/2}$ | | | 1 | | | 1 | 1 | |
| ↓ $Y_1$ | | 1 | 1 | | 1 | 1 | | 1 |
| ↑ $y_1$ $Y_0$ ↑ | | 1 | 1 | 1 | 1 | 1 | 1 | |

Symbols added to the multivalued functional elements shown in FIG. 1a indicate physical functions listed in Table 2. Several kinds of logical elements may apply to these multivalued functional elements.

TABLE 2

| Symbol | Function |
|---|---|
| 1/2 ⊕ | (1) Ternary AND Circuit<br>(2) Ternary Threshold Value Element<br>(3) Quantizing Functional Element<br>Any one of them can logically output "0" or "1/2". |
| ⊕ | (1) Binary Threshold Value Element<br>(2) Quantizing Functional Element<br>Any one of them can logically output "0" or "1". |

These logical elements may apply to the binary input circuit shown in FIGS. 2 and 3 as well as a ternary logical circuit (equivalent circuit, OR circuit, AND circuit and so forth) composing the ternary adder shown in FIGS. 1a and 1b.

Table 3 lists ternary added outputs <Z', Z> and binary added outputs <$Z_2$, $Z_1$> and codes allocated for them.

TABLE 3

| Z' | Z | $Z_2$ | $Z_1$ |
|---|---|---|---|
| 0 | 0 | 0 | 0 |
| 0 | ½ | 0 | 1 |
| 0 | 1 | 1 | 0 |
| 1 | 0 | 1 | 1 |

In FIG. 1a, $x_0$ and $x_1$ are indicated by the equivalent circuits. In this case, since x is a binary signal, they may be output signals of the x bar and the x. This holds true to $y_0$ and $y_1$ in FIG. 1a.

As indicated in the table 1, in place of (1, 0) for (x, X), (½, 0) may be allocated and in place of (1, 0) for (y, Y), (½, 0) may be allocated.

In this embodiment, for (½, 0), the similar synthesis may be executed. Hence, the description about this case is not herein. In the Chart 1, a blank portion is "0", "1" is ½, "2" is 1, and "3" is (10). Based on these values, the ternary adder shown in FIGS. 1a and 1b is arranged.

In the carry outputs listed in the Chart 2, a blank is "0". The value of "1" is 1. On these values, the ternary adder shown in FIGS. 1a and 1b is arranged.

Figure 4:
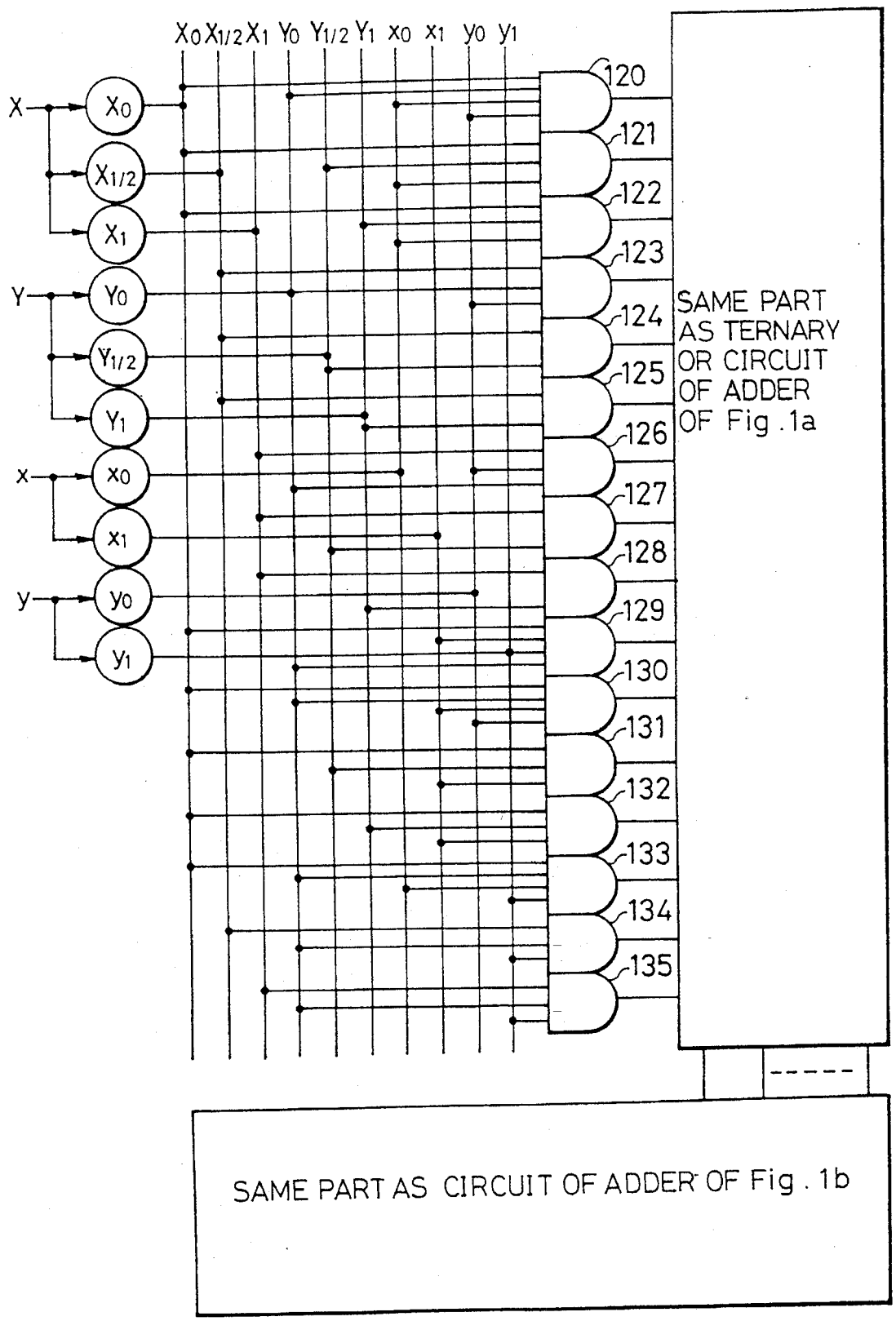
FIG. 4 is a circuit diagram showing an arrangement of a ternary adder according to a second embodiment of the present invention.

FIG. 4 is a circuit diagram showing an arrangement of a ternary adder according to a second embodiment of the present invention. The essential arrangement of the ternary adder shown in FIG. 4 is the same as that of the ternary adder shown in FIGS. 1a and 1b, except the input arrangements of AND elements 120 to 135.

Later, the description will be oriented to the inputs of the AND elements 120 to 135 shown in FIG. 4. The other part is the same as that shown in FIGS. 1a and 1b. Hence, the description about the part is left out.

The AND element 120 inputs binary signals $X_0$, $Y_0$, $x_0$ and $y_0$ and outputs a logical product of these signals. The AND element 121 inputs binary signals $X_0$, $Y_{1/2}$, and $x_0$ and outputs a logical product of these signals. The AND element 122 inputs binary signals $X_0$, $Y_1$ and $x_0$ and outputs a logical product of these signals. The AND element 123 inputs binary signals $X_{1/2}$, $Y_0$ and $y_0$ and outputs a logical product of these signals.

The AND element 124 inputs binary signals $X_{1/2}$ and $Y_{1/2}$ and outputs a logical product of these signals. The AND element 125 inputs binary signals $X_{1/2}$ and $Y_1$ and outputs a logical product of these signals. The AND element 126 inputs binary signals $X_1$, $Y_0$ and $y_0$ and outputs a logical product of these signals.

The AND element 127 inputs binary signals $X_1$ and $Y_{1/2}$ and outputs a logical product of these signals. The AND element 128 inputs binary signals $X_1$ and $Y_1$ and outputs a logical product of these signals.

The AND element 129 inputs binary signals $X_0$, $Y_0$, $x_1$ and $y_1$ and outputs a logical product of these signals. The AND element 130 inputs binary signals $X_0$, $Y_0$, $x_1$ and $y_0$ and outputs a logical product of these signals. The AND element 131 inputs binary signals $X_0$, $Y_{1/2}$ and $x_1$ and outputs a logical product of these signals.

The AND element 132 inputs binary signals $X_0$, $Y_1$ and $x_1$ and outputs a logical product of these signals. The AND element 133 inputs binary signals $X_0$, $Y_0$, $x_0$ and $y_1$ and outputs a logical product of these signals. The AND element 134 inputs binary signals $X_{1/2}$, $Y_0$ and $y_1$ and outputs a logical product of these signals.

The AND element 135 inputs binary signals $X_1$, $Y_0$ and $y_1$ and outputs a logical product of these signals.

Figure 5:
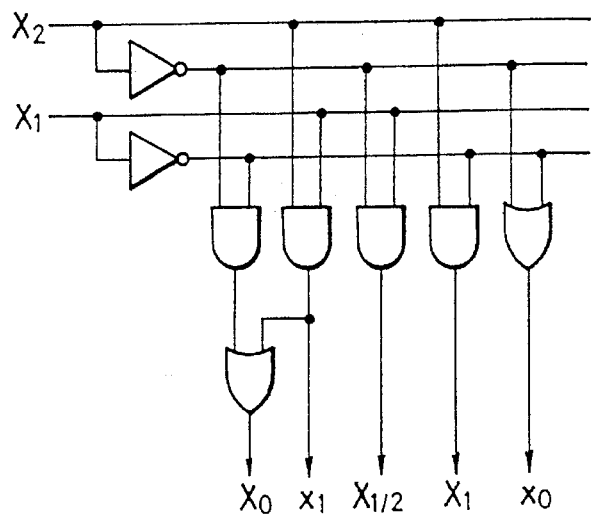
FIG. 5 is a circuit diagram showing an arrangement of a binary I/O circuit with two values which may apply to the ternary adder shown in FIG. 1 or FIG. 4.
Figure 6:
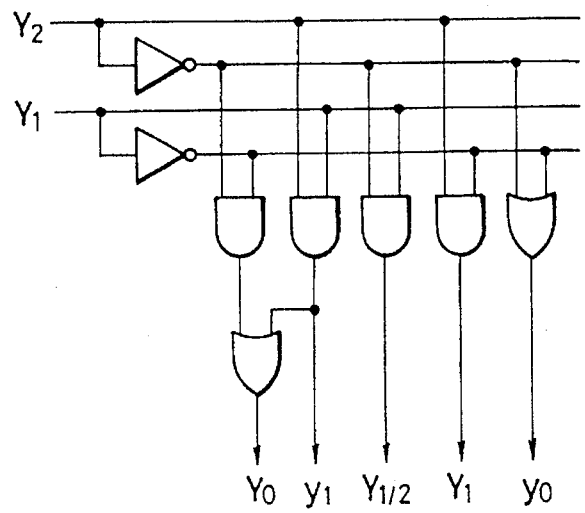
FIG. 6 is a circuit diagram showing an arrangement of a binary I/O circuit with two values which may apply to the ternary adder shown in FIG. 1 or FIG. 4.
Figure 7:
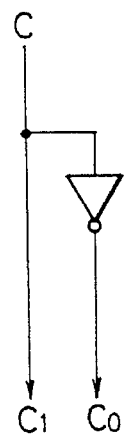
FIG. 7 is a circuit diagram showing an arrangement of a binary I/O circuit with two values which may apply to the ternary or a quaternary adder.

The ternary adder shown in FIGS. 1a and 1b or FIG. 4 may use a binary input and a binary output circuits shown in FIGS. 5 to 7.

In FIGS. 2 and 3, the binary input signal is converted into a ternary output signal. In FIGS. 5 to 7, the input is binary. Thus, the binary output can be obtained.

The logics listed in Charts 3 and 4 are the substantially same as the logics of the above-mentioned adder, except that the used signals are $x_0X_0$, $X_{1/2}$, $X_1$, $x_1X_0$ and the used signals are $y_0Y_0$, $Y_{1/2}$, $Y_1$ and $y_1Y_0$.

Chart 3
<Z', Z>

| | ← $C_0$ → | | | | ← $C_1$ → | | |
|---|---|---|---|---|---|---|---|
| | $x_0X_0$ | $X_{1/2}$ | $X_1$ | $x_1X_0$ | $x_0X_0$ | $X_{1/2}$ | $X_1$ | $x_1X_0$ |
| $y_0Y_0$ | | 1 | 2 | 3 | 1 | 2 | 3 | |
| $Y_{1/2}$ | 1 | 2 | 3 | | 2 | 3 | | 1 |
| $Y_1$ | 2 | 3 | | 1 | 3 | | 1 | 2 |
| $y_1Y_0$ | 3 | | 1 | 2 | | 1 | 2 | 3 |

Chart 4
<C>

| | ← $C_0$ → | | | | ← $C_1$ → | | |
|---|---|---|---|---|---|---|---|
| | $x_0X_0$ | $X_{1/2}$ | $X_1$ | $x_1X_0$ | $x_0X_0$ | $X_{1/2}$ | $X_1$ | $x_1X_0$ |
| $y_0Y_0$ | | | | | | | | 1 |
| $Y_{1/2}$ | | | | 1 | | | 1 | 1 |
| $Y_1$ | | 1 | 1 | | 1 | 1 | 1 |
| $y_1Y_0$ | 1 | 1 | 1 | 1 | 1 | 1 | 1 |

The Charts 3 and 4 lists logical expressions, on which the ternary adder shown in FIG. 4 may be arranged. The output signals $X_0$, $x_1$, $X_{1/2}$, $X_1$ and $x_0$ shown in FIG. 5 are used as the binary input signals $X_0$, $x_1$, $X_{1/2}$, $X_1$ and $x_0$ of the ternary adder shown in FIG. 1 or 4. Likewise, the output signals $Y_0$, $y_1$, $Y_{1/2}$, $Y_1$ and $y_0$ shown in FIG. 6 may be used as the binary input signals $Y_0$, $y_1$, $Y_{1/2}$, $Y_1$ and $y_0$. In FIG. 7, $C_1$ and $C_0$ may be replaced with the output signals of the equivalent circuits $C_0$ and $C_1$. The binary signal and the ternary signal are not used at one time. However, both of these signals may be used in combination.

Figure 8A:
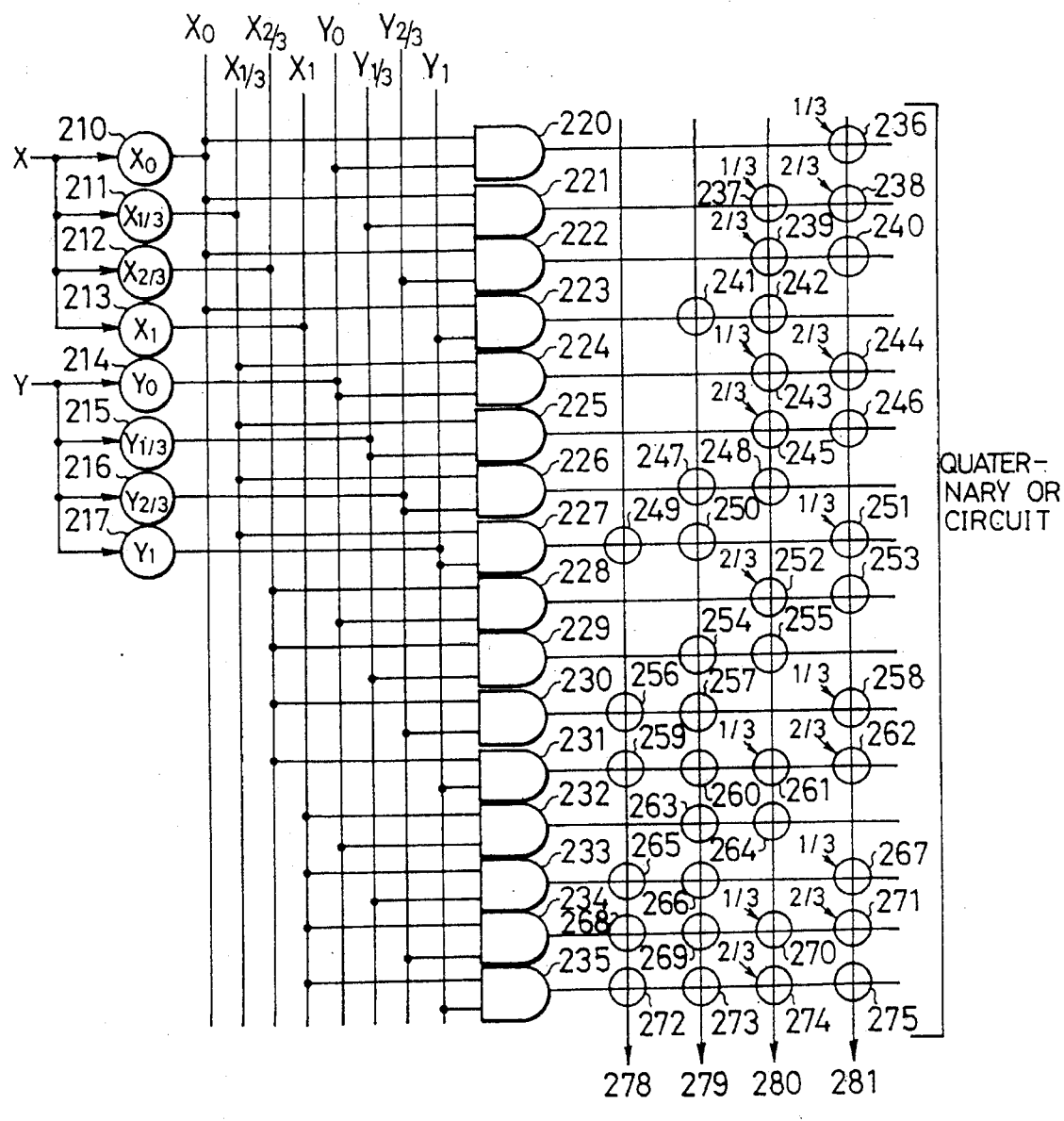
FIG. 8a is a circuit diagram showing a partial arrangement of a quaternary adder according to a third embodiment of the present invention.
Figure 8B:
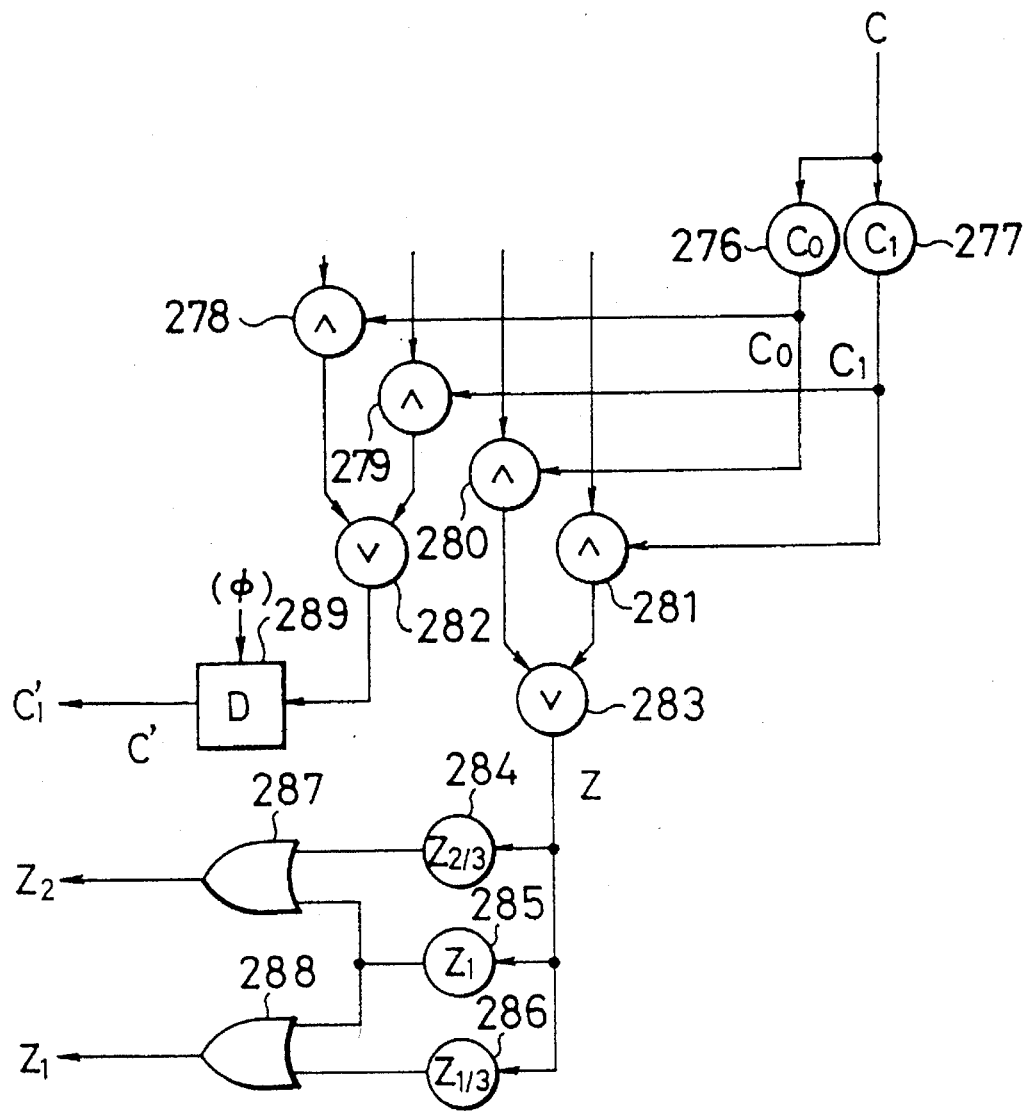

FIGS. 8a and 8b are a circuit diagram showing an arrangement of a quaternary adder according to a third embodiment of the present invention. In the following description about the quaternary adder, the quantizing functional elements (referred to as quantizing elements) will be used as its multivalued functional elements.

The quaternary adder shown in FIGS. 8a and 8b is arranged to have I/O elements 210 to 217, AND elements 220 to 235, quantizing elements 238 to 275, I/O element 276 and 277, AND elements 278 to 281, OR elements 282 and 283, I/O elements 284 to 286, OR elements 287 and 288, and a one-bit delay circuit 289.

Next, each component will be described.

The I/O element 210 inputs a quaternary signal X and outputs a binary signal $X_0$. The I/O element 211 inputs a quaternary signal X and outputs a binary signal $X_{1/3}$. The I/O element 212 inputs a quaternary signal X and outputs a binary signal $X_{2/3}$. The I/O element 213 inputs a quaternary signal X and outputs a binary signal $X_1$.

The I/O element 214 inputs a quaternary signal Y and outputs a binary signal $Y_0$. The I/O element 215 inputs a quaternary signal Y and outputs a binary signal $Y_{1/3}$. The I/O element 216 inputs a quaternary signal Y and outputs a binary signal $Y_{2/3}$. The I/O element 217 inputs a quaternary signal Y and outputs a binary signal $Y_1$.

The AND element 220 inputs the binary signals $X_0$ and $Y_0$ and outputs a logical product of them. The AND element 221 inputs the binary signals $X_0$ and $Y_{1/3}$ and outputs a logical product of them. The AND element 222 inputs the binary signals $X_0$ and $Y_{2/3}$ and outputs a logical product of them. The AND element 223 inputs the binary signals $X_0$ and $Y_1$ and outputs a logical product of them.

The AND element 224 inputs the binary signals $X_{1/3}$ and $Y_0$ and outputs a logical product of them. The AND element 225 inputs the binary signals $X_{1/3}$ and $Y_{1/3}$ and outputs a logical product of them. The AND element 226 inputs the binary signals $X_{1/3}$ and $Y_{2/3}$ and outputs a logical product of them. The AND element 227 inputs the binary signals $X_{1/3}$ and $Y_1$ and outputs a logical product of them.

The AND element 228 inputs the binary signals $X_{2/3}$ and $Y_0$ and outputs a logical product of them. The AND element 229 inputs the binary signals $X_{2/3}$ and $Y_{1/3}$ and outputs a logical product of them. The AND element 230 inputs the binary signals $X_{2/3}$ and $Y_{2/3}$ and outputs a logical product of them. The AND element 231 inputs the binary signals $X_{2/3}$ and $Y_1$ and outputs a logical product of them.

The AND element 232 inputs the binary signals $X_1$ and $Y_0$ and outputs a logical product of them. The AND element 233 inputs the binary signals $X_1$ and $Y_{1/3}$ and outputs a logical product of them. The AND element 234 inputs the binary signals $X_1$ and $Y_{2/3}$ and outputs a logical product of them. The AND element 235 inputs the binary signals $X_1$ and $Y_1$ and outputs a logical product of them.

The quantizing element 236 inputs an output signal from the AND element 220 and outputs a quaternary threshold value.

The quantizing element 237 inputs an output signal from the AND element 221 and outputs a quaternary threshold value. The quantizing element 238 inputs an output signal from the AND element 221 and outputs a quaternary threshold value.

The quantizing element 239 inputs an output signal from the AND element 222 and outputs a quaternary threshold value. The quantizing element 240 inputs an output signal from the AND element 222 and outputs a binary threshold value.

The quantizing element 241 inputs an output signal from the AND element 228 and outputs a binary threshold value. The quantizing element 242 inputs an output signal from the AND element 228 and outputs a binary threshold value.

The quantizing element 243 inputs an output signal from the AND element 224 and outputs a quaternary threshold value. The quantizing element 244 inputs an output signal from the AND element 224 and outputs a quaternary threshold value.

The quantizing element 245 inputs an output signal from the AND element 225 and outputs a quaternary threshold value. The quantizing element 248 inputs an output signal from the AND element 225 and outputs a binary threshold value.

The quantizing element 247 inputs an output signal from the AND element 226 and outputs a binary threshold value. The quantizing element 248 inputs an output signal from the AND element 226 and outputs a binary threshold value.

The quantizing element 249 inputs an output signal from the AND element 227 and outputs a binary threshold value. The quantizing element 250 inputs an output signal from the AND element 227 and outputs a binary threshold value. The quantizing element 251 inputs an output signal from the AND element 227 and outputs a quaternary threshold value.

The quantizing element 252 inputs an output signal from the AND element 228 and outputs a quaternary threshold value. The quantizing element 253 inputs an output signal from the AND element 228 and outputs a binary threshold value.

The quantizing element 254 inputs an output signal from the AND element 229 and outputs a binary threshold value. The quantizing element 255 inputs an output signal from the AND element 229 and outputs a binary threshold value.

The quantizing element 256 inputs an output signal from the AND element 280 and outputs a binary threshold value. The quantizing element 257 inputs an output signal from the AND element 280 and outputs a binary threshold value. The quantizing element 258 inputs an output signal from the AND element 230 and outputs a quaternary threshold value.

The quantizing element 259 inputs an output signal from the AND element 231 and outputs a binary threshold value. The quantizing element 260 inputs an output signal from the AND element 231 and outputs a binary threshold value. The quantizing element 261 inputs an output signal from the AND element 231 and outputs a quaternary threshold value. The quantizing element 262 inputs an output signal from the AND element 231 and outputs a quaternary threshold value.

The quantizing element 263 inputs an output signal from the AND element 232 and outputs a binary threshold value. The quantizing element 264 inputs an output signal from the AND element 282 and outputs a binary threshold value.

The quantizing element 285 inputs an output signal from the AND element 233 and outputs a binary threshold value. The quantizing element 266 inputs an output signal from the AND element 233 and outputs a binary threshold value. The quantizing element 267 inputs an output signal from the AND element 233 and outputs a quaternary threshold value.

The quantizing element 268 inputs an output signal from the AND element 234 and outputs a binary threshold value. The quantizing element 269 inputs an output signal from the AND element 234 and outputs a binary threshold value. The quantizing element 270 inputs an output signal from the AND element 234 and outputs a quaternary threshold value. The quantizing element 271 inputs an output signal from the AND element 234 and outputs a quaternary threshold value.

The quantizing element 272 inputs an output signal from the AND element 235 and outputs a binary threshold value. The quantizing element 273 inputs an output signal from the AND element 235 and outputs a binary threshold value. The quantizing element 274 inputs an output signal from the AND element 235 and outputs a quaternary threshold value. The quantizing element 275 inputs an output signal from the AND element 235 and outputs a binary threshold value.

The I/O element 276 inputs a carry signal C and outputs a binary carry signal $C_0$. The I/O element 277 inputs the carry signal C and outputs a binary carry signal $C_1$.

The AND element 278 inputs an output signal from any one of the quantizing elements 249, 256, 259, 265, 268 and 272 and the binary carry signal $C_0$ from the I/O element 276 and outputs a logical product of them. The AND element 279 inputs an output signal from any one of the quantizing elements 241, 247, 250, 254, 257, 260, 263, 266, 269 and 278 and the binary carry signal $C_1$ from the I/O element 277 and outputs a logical product of them.

The OR element 282 inputs the logical products from the AND elements 278 and 279 and outputs a logical sum of them.

The delay circuit 289 inputs the logical sum from the OR element 282 and outputs a binary carry signal C'. The binary carry signal C' is outputted as a carry signal $C'_1$.

The AND element 280 inputs an output signal from any one of the quantizing elements 287, 289, 242, 248, 245, 248, 252, 255, 261, 264, 270 and 274 and the binary carry signal $C_0$ from the I/O element 276 and outputs a logical product of them. The AND element 281 inputs an output signal from any one of the quantizing elements 236, 288, 240, 244, 246, 251, 253, 258, 262, 267, 271 and 275 and the binary carry signal $C_1$ from the I/O element 277 and outputs a logical product of them. The OR element 283 inputs the logical products from the AND elements 280 and 281 and outputs a logical sum of them, that is, an added output Z. The added output Z is applied to the I/O elements 284, 285 and 286. The I/O element 284 inputs the added output Z and outputs an added output $Z_{2/3}$. The I/O element 285 inputs the added output Z and outputs an added output $Z_1$. The I/O element 286 inputs the added output Z and outputs an added output $Z_{1/3}$.

The OR element 287 inputs the added output $Z_{2/3}$ from the I/O element 284 and the added output $Z_1$ from the I/O element 285 and outputs a logical sum of them, that is, an added output $Z_2$. The OR element 288 inputs the added output $Z_1$ from the I/O element 285 and the added output $Z_{1/3}$ from the I/O element 286 and outputs a logical sum of them, that is, the added output $Z_1$.

Figure 9:
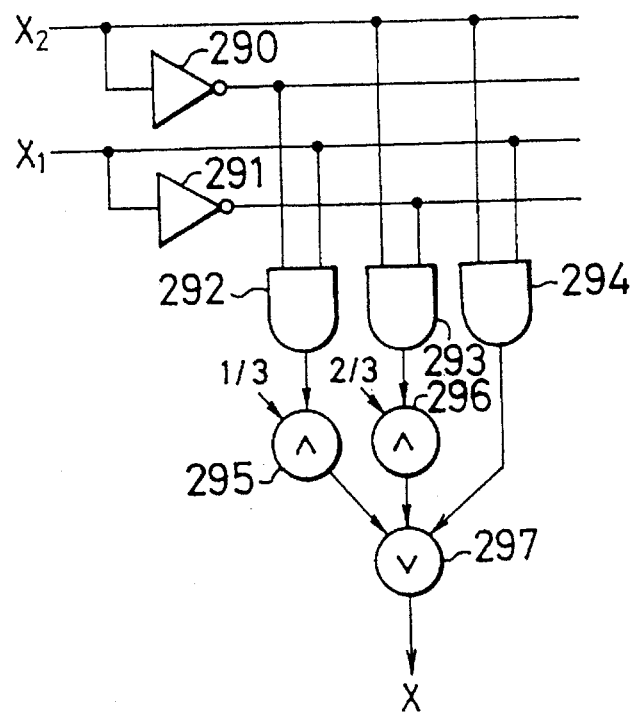
FIG. 9 is a circuit diagram showing an arrangement of a binary I/O circuit with four values which may apply to the quaternary adder shown in FIGS. 8a and 8b.

The quaternary signal X shown in FIG. 8 can be obtained by the binary input circuit shown in FIG. 9. The binary input circuit is composed of NOT elements 290, 291, AND elements 292 to 296 and an OR element 297.

Next, the description will be oriented to the operation of the binary input circuit shown in FIG. 9.

The NOT element 290 inputs the binary signal $X_2$ and outputs the NOT signal. The NOT element 291 inputs the binary signal $X_1$ and outputs the NOT signal.

The AND element 292 inputs the output signal from the NOT element 290 and the binary signal $X_1$ and outputs a logical product of them. The AND element 293 inputs the output signal from the NOT element 291 and the binary signal $X_2$ and outputs a logical product of them. The AND element 294 inputs the binary signal $X_2$ and the binary signal $X_1$ and outputs a logical product of them. The AND element 295 inputs the logical product from the AND element 292 and a quaternary threshold value 1/3 and outputs a logical product of them. The AND element 296 inputs the logical product from the AND element 293 and a quaternary threshold value 2/3 and outputs a logical product of them.

The OR element 297 inputs the logical product from the AND element 295, the logical product from the AND element 296 and the logical product from the AND element 294 and outputs a logical sum of them, that is, a quaternary signal X.

Figure 10:
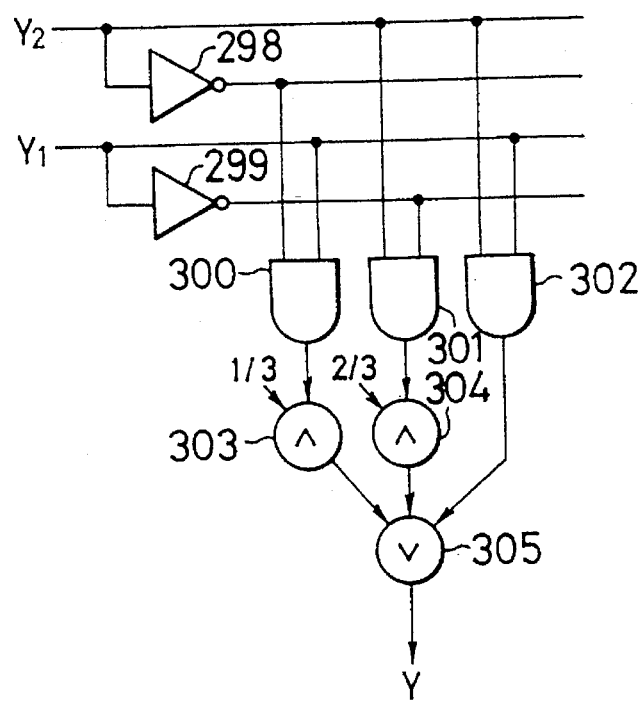
FIG. 10 is a circuit diagram showing an arrangement of a binary I/O circuit with four values which may apply to the quaternary adder shown in FIGS. 8a and 8b.

The quaternary input signal Y shown in FIG. 8a can be obtained by the binary input circuit shown in FIG. 10.

The binary input circuit shown in FIG. 10 is composed of NOT elements 298 and 299, AND elements 300 to 304, and an OR element 305.

Next, the description will be oriented to the operation of the binary input circuit shown in FIG. 10.

The NOT element 298 inputs a binary signal $Y_2$ and outputs the NOT signal of it. The NOT element 299 inputs a binary signal $Y_1$ and outputs the NOT of it.

The AND element 800 inputs an output signal from the NOT element 298 and the binary signal $Y_1$ and outputs a logical product of them. The AND element 301 inputs an output signal from the NOT element 299 and the binary signal $Y_2$ and outputs a logical product of them. The AND element 302 inputs the binary signals $Y_2$ and $Y_1$ and outputs a logical product of them. The AND element 303 inputs the logical product from the AND element 300 and a quaternary threshold value 1/3 and outputs a logical product of them. The AND element 304 inputs the logical product From the AND element 301 and a quaternary threshold value 2/3 and outputs a logical product of them.

The OR element 305 inputs the logical products From the AND elements 302, 303 and 304 and outputs a logical sum of them, that is, a quaternary signal Y.

Table 4 lists codes allocated For two-bit parallel binary input signals $X_2$, $X_1$, $Y_2$ and $Y_1$, quaternary output signals X and Y, and carry signals $C_2$, $C_1$ and C.

TABLE 4

| $X_2$ | $X_1$ | $Y_2$ | $Y_1$ | X | Y | $C_2$ | $C_1$ | C | |
|---|---|---|---|---|---|---|---|---|---|
| 0 | 0 | 0 | 0 | 0 | 0 | 0 | 0 | 0 | |
| 0 | 1 | 0 | 1 | 1/3 | 1/3 | 0 | 1 | 1 | (1/3) |
| 1 | 0 | 1 | 0 | 2/3 | 2/3 | — | — |  |  |
| 1 | 1 | 1 | 1 | 1 | 1 | — | — |  |  |

Expressions (3) and (4) indicate logical expressions corresponding to the Table 4.

$$X = \frac{1}{3}\overline{X_2}X_1 + \frac{2}{3}X_2\overline{X_1} + X_2X_1 \quad (3)$$

$$Y = \frac{1}{3}\overline{Y_2}Y_1 + \frac{2}{3}Y_2\overline{Y_1} + Y_2Y_1 \quad (4)$$

Chart 5 lists logics provided in the quaternary adder. Chart 6 lists carry outputs.

Chart 5
<Z>

|  | ← $C_0$ → |  |  |  | ← $C_1$ → |  |  |  |
|---|---|---|---|---|---|---|---|---|
|  | $X_0$ | $X_{1/3}$ | $X_{2/3}$ | $X_1$ | $X_0$ | $X_{1/3}$ | $X_{2/3}$ | $X_1$ |
| $Y_0$ |  | 1 | 2 | 3 | 1 | 2 | 3 |  |
| $Y_{1/3}$ | 1 | 2 | 3 |  | 2 | 3 |  | 1 |
| $Y_{2/3}$ | 2 | 3 |  | 1 | 3 |  | 1 | 2 |
| $Y_1$ | 3 |  | 1 | 2 |  | 1 | 2 | 3 |

Chart 6
<C>

|  | ← $C_0$ → |  |  |  | ← $C_1$ → |  |  |  |
|---|---|---|---|---|---|---|---|---|
|  | $X_0$ | $X_{1/3}$ | $X_{2/3}$ | $X_1$ | $X_0$ | $X_{1/3}$ | $X_{2/3}$ | $X_1$ |
| $Y_0$ |  |  |  |  |  |  |  | 1 |
| $Y_{1/3}$ |  |  |  | 1 |  |  | 1 | 1 |
| $Y_{2/3}$ |  |  | 1 | 1 |  | 1 | 1 | 1 |
| $Y_1$ |  | 1 | 1 | 1 | 1 | 1 | 1 | 1 |

The symbols added to the quantizing elements shown in FIG. 8a stand for physical functions listed in Table 5.

TABLE 5

| Symbol | | Function |
|---|---|---|
| 1/3 | A | (1) Quaternary AND Circuit<br>(2) Quaternary Threshold Value Element<br>(3) Quantizing Functional Element |
| 2/3 | B | For the case of A, any one can logically output a value of "0" or "1/3".<br>For the case of B, any one can logically output a value of "0" or "2/3". |
|  |  | (1) Binary Threshold Value Element<br>(2) Quantizing Functional Element<br>Any one can logically output a value of "0" or "1". |

Several kinds of logical elements may apply to the quantizing elements shown in FIG. 8a. These logical elements may apply to the binary input circuit shown in FIGS. 9 and 10 as well as the quaternary logic circuit (equivalent circuit, OR circuit, AND circuit and so forth) composing the quaternary adder shown in FIGS. 8a and 8b.

Table 6 lists the quaternary added output <Z> and the binary added output <$Z_2$, $Z_1$> and a relation among codes.

TABLE 6

| Z | $Z_2$ | $Z_1$ |
|---|---|---|
| 0 | 0 | 0 |
| 1/3 | 0 | 1 |
| 2/3 | 1 | 0 |
| 1 | 1 | 1 |

In FIG. 4, $x_0$ and $x_1$ are denoted by the equivalent circuits. Since the binary signal is used in this case, x and a bar x may be used as an output signal. This holds true to $y_0$ and $y_1$ shown in FIG. 4.

In the logics listed in the Chart 5, the blank is "0" The value of "1" is 1/3. The value of "2" is 2/3. The value of "3" is 1. On these values, the quaternary adder shown in FIGS. 8a and 8b is arranged. In the carry output listed in the Chart 8, the blank is "0". The value of "1" is 1. On these values, the quaternary adder shown in FIGS. 8a and 8b is arranged.

Figure 11:
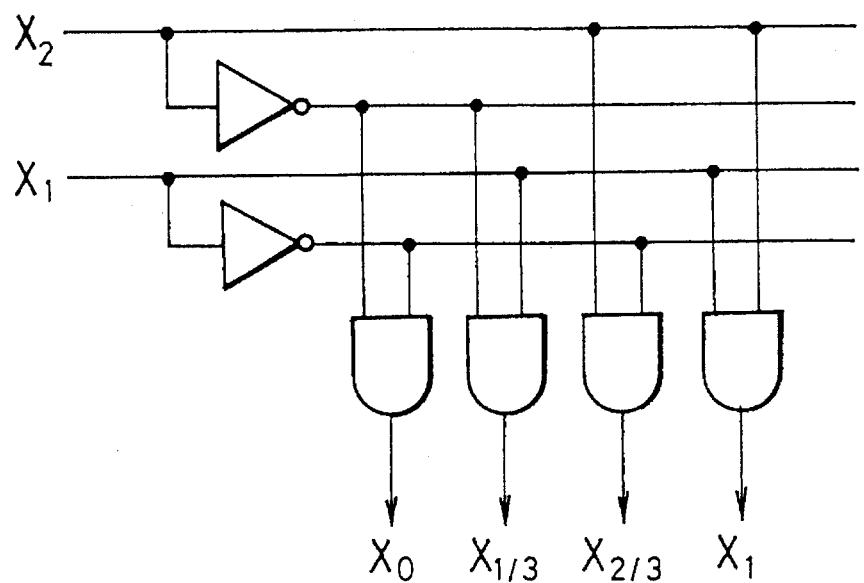
FIG. 11 is a circuit diagram showing a binary I/O circuit with two values which may apply to the quaternary adder shown in FIGS. 8a and 8b.
Figure 12:
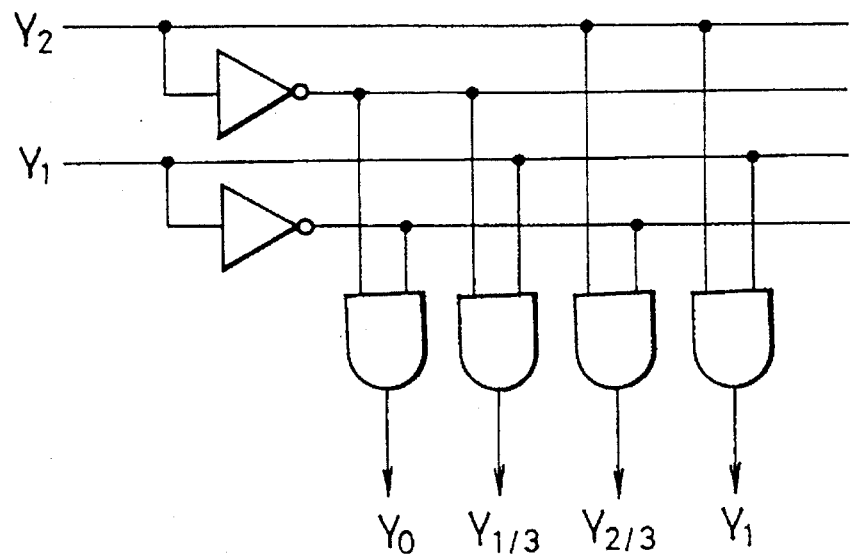
FIG. 12 is a circuit diagram showing an arrangement of a binary I/O circuit with two values which may apply to the quaternary adder shown in FIGS. 8a and 8b.

The circuits shown in FIGS. 11 and 12 use binary inputs and binary outputs.

The output signals $X_0$, $X_{1/3}$, $X_{2/3}$, and $X_1$ shown in FIG. 11 may be used as binary input signals $X_0$, $X_{1/3}$, $X_{2/3}$ and $X_1$ used in the quaternary adder shown in FIGS. 8a and 8b. This holds true to the output signals $Y_0$, $Y_{1/3}$, $Y_{2/3}$ and $Y_1$ shown in FIG. 12. The binary signal and the quaternary signal cannot be used at one time. However, these signals may be used in combination.

Figure 13:
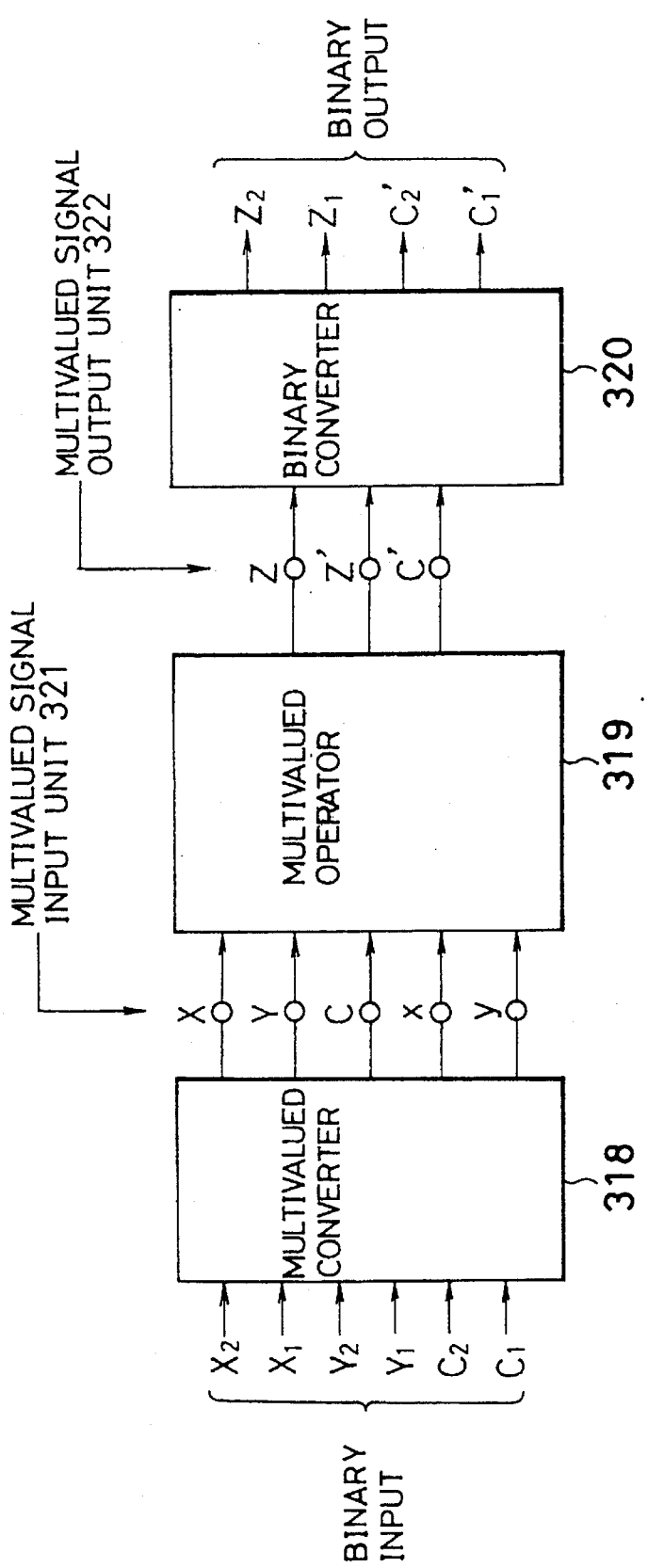
FIG. 13 is a circuit diagram showing an arrangement of an operator using the multivalued adder according to the present invention.

FIG. 13 is a circuit diagram showing an arrangement of an operator arranged to have a multivalued converter 318, a multivalued operator 319, a binary converter 320, a multivalued signal input unit 321, and a multivalued signal output unit 322.

To use only the ternary input signal, what is required is only to input the ternary signal from the multivalued input unit 321. For the multivalued operator 319, the ternary adder shown in FIG. 1 or 4 may be used. To use only the quaternary input signal, what is required is only to input the quaternary signal from the multivalued signal input unit 321. For the multivalued operator 319, the quaternary adder shown in FIGS. 8a and 8b may be used.

In addition to a way of use described above, it is possible to combine the I/O signals with the binary signal and the multivalued signal in a various manner as shown in FIG. 13.

According to the above-mentioned embodiment, the adding speed is allowed to be doubled. Though the clock frequency is reduced in half, the adding speed may be kept. This means the power consumption of the adder is lowered. Further, keeping the circuit in scale means reduction of logical elements or circuit elements composing the adder in number, thereby making it possible to lower the power consumption.

If the processing amount of bit signals to be executed at a time is increased, the multivalued logics and the multivalued functional elements allow a rapid adding speed to be realized without having to increase the adder circuit in scale.

This multivalued adder can be used for an adder circuit, a multiplier, a divider, a root operation circuit.

Many widely different embodiments of the present invention may be constructed without departing from the spirit and scope of the present invention. It is to be understood that the invention is not limited to the disclosed embodiments, but on the contrary, is intended to cover various modifications and equivalent arrangements included within the spirit and scope of the appended claims.

What is claimed is:

1. An apparatus for processing addition between a first data and a second data, each of said first and second data being in one of binary logic and multivalued logic, comprising:

first input means having parallel inputs of binary logic and multivalued logic for receiving said first data, and for outputting a first set of bit data representing said first data;

second input means having parallel inputs of binary logic and multivalued logic for receiving said second data, and for outputting a second set of bit data representing said second data;

adding means connected to said first input means and said second input means for adding said second set of bit data and said first set of bit data; and output means, connected to said adding means, for converting output of said adding means into data in binary logic and multivalued logic, in parallel, and for outputting converted data in binary logic and multivalued logic, in parallel.

2. An apparatus according to claim 1, wherein said adding means includes a plurality of AND circuits and a plurality of multivalued functional elements.

3. An apparatus according to claim 2, wherein each of said multivalued functional elements receives data and outputs a threshold signal representing a threshold value of multivalued logic.

4. An apparatus according to claim 1, wherein said multivalued logic is ternary logic.

5. An apparatus according to claim 4, wherein each of said first set of bit data and said second set of bit data includes five binary data.

6. An apparatus according to claim 1, wherein said multivalued logic is quaternary logic.

7. An apparatus according to claim 6, wherein each of said first set of bit data and said second set of bit data includes six binary data.

8. An apparatus for processing an addition between a first data and a second data, each of said first and second data being in one of binary logic and multivalued logic, comprising:

multivalued converting means for receiving said first data if said first data is in binary logic, and for converting said first data into data in multivalued logic, said multivalued converting means for receiving said second data if said second data is in binary logic, and for converting said second data into data in multivalued logic;

multivalued input means for receiving said first data if said first data is in multivalued logic, and for receiving said second data if said second data is in multivalued logic;

adding means, connected to said multivalued converting means and said multivalued input means, for adding said second data in multivalued logic output by one of said multivalued converting means and said multivalued input means and said first data in multivalued logic output by one of said multivalued converting means and said multivalued input means;

multivalued output means connected to said adding means for outputting an addition result of said adding performed by said adding means; and binary converting means connected to said adding means in parallel with said multivalued output means for converting said addition result into data in binary logic and for outputting said addition result in binary logic.

9. An apparatus according to claim 8, wherein said adding means includes a plurality of AND circuits and a plurality of multivalued functional elements.

10. An apparatus according to claim 9, wherein each of said multivalued functional elements receives data and outputs a threshold signal representing a threshold value of multivalued logic.

11. An apparatus according to claim 8, wherein said multivalued logic is ternary logic.

12. An apparatus according to claim 8, wherein said multivalued logic is quaternary logic.

* * * * *